United States Patent Office 2,850,553
Patented Sept. 2, 1958

2,850,553

STABILIZED BENZOTHIAZOLESULFENAMIDE COMPOSITION AND METHOD OF PREPARING THE SAME

Harold P. Roberts, Tallmadge, Ohio, assignor to The Goodyear Tire & Rubber Company, Akron, Ohio, a corporation of Ohio No Drawing. Application June 20, 1955
Serial No. 516,806

19 Claims. (Cl. 260—785)

This invention relates to 2-benzothiazolesulfenamides.

Benzothiazolesulfenamides are excellent accelerators for the vulcanization of rubber. They are delayed action type accelerators and can be used to produce non-scorchy stocks that do not cure prematurely during mixing operations. These accelerators can be prepared by the oxidative condensation of amines with disulfides and other methods which are well known in the art.

Benzothiazolesulfenamides are somewhat unstable chemically and slowly decompose to form the amine, the 2,2′ bis benzothiazyldisulfide and the amine salt of the mercaptobenzothiazole. The decomposition reaction is autocatalytic and it has been found that the greater the build-up of the free amine concentration, the poorer is the stability of the sulfenamide.

Decomposition of these sulfenamides reduces the effective concentration of the sulfenamide available to act as an accelerator. This introduces an uncertainty as to the amount of the sulfenamide accelerator available from any particular batch and is highly undesirable because the sulfenamides cannot be stored for any length of time and remain of constant composition.

In addition, some of the sulfenamide accelerators are low melting compounds and on storage tend to sinter together to form a large lump or agglomerate which is difficult to weigh out and to handle in the usual equipment. This massing together of the low melting materials can be caused by pressure of the material on itself when stored in a large amount or it can be caused by exposure to a temperature close to or above the melting point of the accelerator. The massing together of the material allows the amine concentration to build up and the decomposition of the sulfenamide is accelerated.

It is an object of this invention to produce sulfenamides having improved stability. Another object of this invention is to avoid the undesirable effects of the low melting points of some 2-benzothiazolesulfenamides. A particular object is to produce sulfenamides in an improved form in which they can be shipped, stored, handled and consumed in a practical manner. Other objects and advantages will appear as the description of the invention proceeds.

According to this invention the sulfenamide is mixed with and absorbed into a finely divided pigment or other powdery material to produce a dry, free-flowing composition of improved stability. Various finely divided materials can be used as the absorbent to produce the free-flowing composition. These can be organic or inorganic and can be of natural or synthetic origin.

The compositions of the invention are readily made by mixing the sulfenamide in liquid state with the powdery material to distribute the sulfenamide throughout the mass. While the liquid sulfenamide can be added to cool finely divided material it is preferable to have both the sulfenamide and the finely divided material warm as this facilitates mixing and absorption of the sulfenamide into the finely divided material. The mixing of the powdery material and the sulfenamide can be carried out in any desired type of mixing equipment. The sulfenamide can be added to the finely divided material or, if desired, the finely divided material can be added to the liquid sulfenamide. Any weight ratio of sulfenamide to powdery material in the range of 1:4 to 4:1 can be used, but the preferred range is from 1:3 to 3:1.

The dry free-flowing property can be conferred on the sulfenamide by mixing it in liquid state with any finely divided material or powder having a melting point above that of the accelerator, but if the material used is an inert material (i. e. one that does not react with the sulfenamide or accelerate its decomposition) an additional advantage is obtained. The sulfenamide is stabilized and very little decomposition of the sulfenamide occurs, even when the mixture is stored at room temperature for long periods of time. Not only is the sulfenamide converted to a dry free-flowing powder, but also the shelf-life is extended because the chemical stability is so greatly improved. Any material can be used which is of a grade and fineness acceptable for use in rubber. It is preferred to use a finely divided solid rubber compounding ingredient, i. e., a material which is customarily used in rubber compounding, since this avoids the introduction of extraneous material. Representative examples of inert materials having stabilizing action when used in this invention are zinc oxide, litharge, clay, carbon black, talc, calcium carbonate, magnesium oxide, calcium silicate and polyvinyl chloride.

The following example illustrates the preparation of a composition of this invention:

*Example 1*

One hundred parts of finely divided zinc oxide, of rubber compounding grade, were heated to 50 to 60° C. The zinc oxide was stirred and 100 parts of molten N,N-diisopropyl-2-benzothiazolesulfenamide were added to the stirred mass. Agitation was continued until the sulfenamide was uniformly distributed and the mixture was cooled below the melting point of the sulfenamide. The mixture was then shaped into rod form by extruding through a perforated plate. It formed a dry, free-flowing, non-dusting material that could be easily handled and could be accurately weighed out, even in small amounts.

In one series of tests, samples were made up according to the above procedure, mixing N,N-diisopropyl-2-benzothiazolesulfenamide with various representative finely divided inert materials. These samples were aged at room temperature and analyzed for sulfenamide content. The results are tabulated below.

| Sample No. | Additive | Ratio N,N-diisopropyl-2-benzothiazole-sulfenamide/additive | Initial sulfenamide content in percent | Percent decrease in sulfenamide content after 72 days at room temperature |
|---|---|---|---|---|
| 1 | None | All N,N-diisopropyl-2-benzothiazolesulfenamide. | 92.4 | 15.4 |
| 2 | ZnO | 1/2 | 31.0 | 4.8 |
| 3 | PbO | 1/2 | | 4.3 |
| 4 | McNamee clay. | 1/2 | 31.5 | 3.5 |
| 5 | Carbon black | 1/1 | 44.6 | 3.6 |
| 6 | Talc | 1/2 | 30.6 | None |
| 7 | CaCO₃ | 1/2 | 36.4 | 1.9 |
| 8 | MgO | 1/1 | 52.8 | 4.2 |
| 9 | Silene "L" | 1/1 | 57.6 | 5.7 |
| 10 | Pliovic W | 1/1 | 44.0 | 2.7 |

In the above table the McNamee clay used is a well-known type of clay used in rubber compounding and is identified as a medium hard clay being a particle size such that 100 percent of it will pass through a 100-mesh screen.

The carbon black used is a medium processing carbon black having a particle size such that 100 percent of it will pass through a 325-mesh screen.

The calcium carbonate used is known in the trade as precipitated chalk and is of a particle size such that 100 percent of it will pass through a 100-mesh screen.

The Silene L used is a precipitated form of calcium silicate, the particle size of which is such that 99.5 percent of it will pass through a 325-mesh screen.

The Pliovic W used is a resin sold by The Goodyear Tire & Rubber Company and is identified as a polyvinyl chloride resin.

Other typical sulfenamides which can be similarly treated are 2-benzothiazolesulfenamide, N-cyclohexyl-2-benzothiazolesulfenamide, N-oxydiethylene-2-benzothiazolesulfenamide, N-methyl-2-benzothiazolesulfenamide, N-ethyl-2-benzothiazolesulfenamide, N-(n-propyl)-2-benzothiazolesulfenamide, N - (n-butyl) - 2 - benzothiazolesulfenamide, N - isobutyl - 2 - benzothiazolesulfenamide, N-(n-amyl)-2-benzothiazolesulfenamide, and N-isopropyl-N-thio-2-benzothiazyl-2-benzothiazolesulfenamide

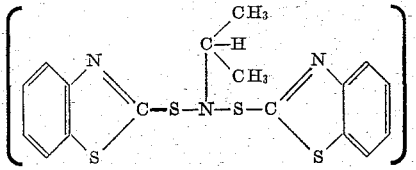

The compositions can be prepared in other physical forms such as granules or a coarse meal by proper selection and use of preforming equipment. The formed compositions made according to this invention are dry, dustless, free-flowing materials of improved stability that can be handled in any of the usual shipping packages such as bags, boxes, and paper cartons.

While certain representative embodiments and details have been shown for the purpose of illustrating the invention, it will be apparent to those skilled in this art that various changes and modifications may be made therein without departing from the spirit or scope of the invention.

I claim:

1. The method of stabilizing a 2-benzothiazolesulfenamide which comprises forming a mixture consisting of the 2-benzothiazolesulfenamide and a finely divided inert material by mixing the 2-benzothiazolesulfenamide in liquid state with a finely divided inert material and cooling said mixture, said sulfenamide and finely divided material being employed in the weight ratio of 1:4 to 4:1.

2. A process according to claim 1 in which the 2-benzothiazolesulfenamide is N,N-diisopropyl-2-benzothiazolesulfenamide.

3. A process according to claim 1 in which the 2-benzothiazolesulfenamide is N-cyclohexyl-2-benzothiazolesulfenamide.

4. A process according to claim 1 in which the 2-benzothiazolesulfenamide is N-oxydiethylene-2-benzothiazolesulfenamide.

5. The method of preparing a dry free-flowing composition which comprises forming a mixture consisting of a 2-benzothiazolesulfenamide and a finely divided material by adding a 2-benzothiazolesulfenamide in liquid state to a warm finely divided material and mixing the materials together, said sulfenamide and finely divided material being employed in the weight ratio of 1:4 to 4:1.

6. The method of preparing a dry free-flowing composition which comprises forming a mixture consisting of a 2-benzothiazolesulfenamide and a finely divided material by adding a 2-benzothiazolesulfenamide in liquid state to a warm finely divided material, mixing the materials together, and forming the resulting composition into shapes by treating with a shape-producing apparatus, said sulfenamide and finely divided material being employed in the weight ratio of 1:4 to 4:1.

7. The method according to claim 6 in which the finely divided inert material is selected from the group consisting of zinc oxide, litharge, clay, carbon black, talc, calcium carbonate, magnesium oxide and calcium silicate.

8. The process according to claim 6 in which the finely divided material is carbon black.

9. The process according to claim 6 in which the finely divided material is zinc oxide.

10. A process according to claim 6 in which the sulfenamide is selected from the group consisting of N,N-diisopropyl-2-benzothiazolesulfenamide, N-cyclohexyl-2-benzothiazolesulfenamide, N-oxydiethylene-2-benzothiazolesulfenamide and N-isopropyl-N-thio-2-benzothiazyl-2-benzothiazolesulfenamide.

11. A stabilized composition consisting of a 2-benzothiazolesulfenamide absorbed into an inert finely divided material in the ratio of from 1:4 to 4:1 of said 2-benzothiazolesulfenamide to said finely divided inert powdery material.

12. A stabilized composition according to claim 11 in which the 2-benzothiazolesulfenamide is N-cyclohexyl-2-benzothiazolesulfenamide.

13. A stabilized composition according to claim 11 in which the 2-benzothiazolesulfenamide is N,N-diisopropyl-2-benzothiazolesulfenamide.

14. A stabilized composition according to claim 11 in which the 2-benzothiazolesulfenamide is N-oxydiethylene-2-benzothiazolesulfenamide.

15. A stabilized composition according to claim 11 in which the finely divided inert material is selected from the group consisting of zinc oxide, litharge, clay, carbon black, talc, calcium carbonate, magnesium oxide and calcium silicate.

16. A stabilized composition according to claim 11 in which the finely divided material is carbon black.

17. A stabilized composition according to claim 11 in which the sulfenamide is selected from the group consisting of N,N - diisopropyl - 2 - benzothiazolesulfenamide, N-cyclohexyl-2-benzothiazolesulfenamide, N-oxydiethylene-2-benzothiazolesulfenamide and N-isopropyl-N-thio-2-benzothiazyl-2-benzothiazolesulfenamide.

18. A stabilized composition according to claim 12 in which the finely divided material is zinc oxide.

19. A stabilized composition according to claim 13 in which the finely divided material is zinc oxide.

References Cited in the file of this patent
UNITED STATES PATENTS
2,653,925  Olin _____ Sept. 29, 1953